US012784751B2

(12) United States Patent
Adya et al.

(10) Patent No.: US 12,784,751 B2
(45) Date of Patent: Nov. 3, 2026

(54) USING VISUAL CONTEXT TO IMPROVE A VIRTUAL ASSISTANT

(71) Applicant: Apple Inc., Cupertino, CA (US)

(72) Inventors: Saurabh Adya, San Jose, CA (US); Sameer Badaskar, San Jose, CA (US); Akanksha Bindal, Mountain View, CA (US); Ahmed S. Hussen Abdelaziz, San Ramon, CA (US); Xiaochuan Niu, Santa Clara, CA (US); Alkeshkumar M. Patel, San Jose, CA (US); Srikanth Vishnubhotla, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 159 days.

(21) Appl. No.: 18/777,427

(22) Filed: Jul. 18, 2024

(65) Prior Publication Data

US 2024/0371378 A1 Nov. 7, 2024

Related U.S. Application Data

(63) Continuation of application No. 17/576,419, filed on Jan. 14, 2022, now Pat. No. 12,073,831.

(60) Provisional application No. 63/138,156, filed on Jan. 15, 2021.

(51) Int. Cl.

| | |
|---|---|
| ***G10L 15/22*** | (2006.01) |
| ***G06F 18/214*** | (2023.01) |
| ***G06V 10/82*** | (2022.01) |
| ***G06V 20/50*** | (2022.01) |
| ***G10L 15/06*** | (2013.01) |
| ***G10L 15/16*** | (2006.01) |
| ***G10L 15/18*** | (2013.01) |
| ***G10L 15/24*** | (2013.01) |

(52) U.S. Cl.

CPC ............ *G10L 15/22* (2013.01); *G06F 18/214* (2023.01); *G06V 10/82* (2022.01); *G06V 20/50* (2022.01); *G10L 15/063* (2013.01); *G10L 15/16* (2013.01); *G10L 15/18* (2013.01); *G10L 15/24* (2013.01)

(58) Field of Classification Search

CPC .......... G10L 15/22; G10L 15/24; G10L 15/16

See application file for complete search history.

(56) References Cited

U.S. PATENT DOCUMENTS

| | | | | |
|---|---|---|---|---|
| 10,832,062 | B1 | 11/2020 | Evans et al. | |
| 2017/0084271 | A1 | 3/2017 | Nakadai et al. | |
| 2018/0288477 | A1* | 10/2018 | Gupta | H04N 21/434 |
| 2020/0042819 | A1* | 2/2020 | Zhang | G06N 3/09 |

(Continued)

OTHER PUBLICATIONS

Applicant-Initiated Interview Summary received for U.S. Appl. No. 17/576,419, mailed on Apr. 1, 2024, 2 pages.

(Continued)

*Primary Examiner* — Ibrahim Siddo

(74) *Attorney, Agent, or Firm* — YHE Law LLP

(57) ABSTRACT

Systems and processes for operating a digital assistant are provided. An example method for processing an image include receiving an image, generating, based on the image, a question corresponding to a first object in the image, generating, based on the image, a caption corresponding to a second object of the image, receiving an utterance from a user, and determining a plurality of speech recognition results from the utterance based on the question and the caption.

36 Claims, 8 Drawing Sheets

(56) References Cited

U.S. PATENT DOCUMENTS

| | | | | |
|---|---|---|---|---|
| 2020/0057925 | A1 | 2/2020 | Tang et al. | |
| 2020/0074872 | A1* | 3/2020 | Kilarapu | G09B 7/00 |

OTHER PUBLICATIONS

Non-Final Office Action received for U.S. Appl. No. 17/576,419, mailed on Mar. 6, 2024, 11 pages.

Notice of Allowance received for U.S. Appl. No. 17/576,419, mailed on May 13, 2024, 14 pages.

* cited by examiner

USING VISUAL CONTEXT TO IMPROVE A VIRTUAL ASSISTANT

CROSS-REFERENCE TO RELATED APPLICATIONS

This application is a continuation of U.S. patent application Ser. No. 17/576,419, entitled "USING VISUAL CONTEXT TO IMPROVE A VIRTUAL ASSISTANT," filed Jan. 14, 2022, which claims priority to U.S. Provisional Patent Application No. 63/138,156, entitled "USING VISUAL CONTEXT TO IMPROVE A VIRTUAL ASSISTANT," filed Jan. 15, 2021, which is hereby incorporated by reference in its entirety.

FIELD

This relates generally to digital assistants and, more specifically, to using images captured by an electronic device to improve the processing of various tasks by a digital assistant.

BACKGROUND

Intelligent automated assistants (or digital assistants) can provide a beneficial interface between human users and electronic devices. Such assistants can allow users to interact with devices or systems using natural language in spoken and/or text forms. For example, a user can provide a speech input containing a user request to a digital assistant operating on an electronic device. The digital assistant can interpret the user's intent from the speech input and operationalize the user's intent into tasks. The tasks can then be performed by executing one or more services of the electronic device, and a relevant output responsive to the user request can be returned to the user. In some cases, requests may be received that are unclear and thus it is desirable for a digital assistant to consider visual context of the electronic device of the user. Further, it may be desirable for the digital assistant to consider the visual context without receiving an input from a user to provide a user with helpful information.

SUMMARY

Example methods are disclosed herein. An example method includes, at an electronic device having one or more processors and memory, receiving an image, generating, based on the image, a question corresponding to a first object in the image, generating, based on the image, a caption corresponding to a second object of the image, receiving an utterance from a user, and determining a plurality of speech recognition results from the utterance based on the question and the caption.

Example non-transitory computer-readable media are disclosed herein. An example non-transitory computer-readable storage medium stores one or more programs. The one or more programs include instruction for receiving an image, generating, based on the image, a question corresponding to a first object in the image, generating, based on the image, a caption corresponding to a second object of the image, receiving an utterance from a user, and determining a plurality of speech recognition results from the utterance based on the question and the caption.

Example electronic devices are disclosed herein. An example electronic device comprises one or more processors; a memory; and one or more programs, where the one or more programs are stored in the memory and configured to be executed by the one or more processors, the one or more programs including instructions for receiving an image, generating, based on the image, a question corresponding to a first object in the image, generating, based on the image, a caption corresponding to a second object of the image, receiving an utterance from a user, and determining a plurality of speech recognition results from the utterance based on the question and the caption.

An example electronic device comprises means for receiving an image, means for generating, based on the image, a question corresponding to a first object in the image, means for generating, based on the image, a caption corresponding to a second object of the image, means for receiving an utterance from a user, and means for determining a plurality of speech recognition results from the utterance based on the question and the caption.

Determining a plurality of speech recognition results from the utterance based on the question and the caption improves the speech recognition capabilities of the digital assistant. In particular, speech recognition results that are unrelated to a generated question or caption may be disregarded by the digital assistant and ignored. In this way, the digital assistant is more likely to determine the correct speech recognition result and correctly understand the user's request. Thus, the responsiveness of the digital assistant is improved, resulting in less power consumption (e.g., improved battery life) and user enjoyment of the digital assistant.

An example method includes, at an electronic device having one or more processors and memory, receiving an image, generating, based on the image, a question corresponding to a first object in the image, retrieving a plurality of speech recognition results based on a received utterance, determining whether a speech recognition result of the plurality of speech recognition results matches the generated question, and in accordance with a determination that the speech recognition result of the plurality of speech recognition results matches the generated question, determining that the received utterance is directed to a digital assistant.

An example non-transitory computer-readable storage medium stores one or more programs. The one or more programs include instruction for receiving an image, generating, based on the image, a question corresponding to a first object in the image, retrieving a plurality of speech recognition results based on a received utterance, determining whether a speech recognition result of the plurality of speech recognition results matches the generated question, and in accordance with a determination that the speech recognition result of the plurality of speech recognition results matches the generated question, determining that the received utterance is directed to a digital assistant.

An example electronic device comprises one or more processors; a memory; and one or more programs, where the one or more programs are stored in the memory and configured to be executed by the one or more processors, the one or more programs including instructions for receiving an image, generating, based on the image, a question corresponding to a first object in the image, retrieving a plurality of speech recognition results based on a received utterance, determining whether a speech recognition result of the plurality of speech recognition results matches the generated question, and in accordance with a determination that the speech recognition result of the plurality of speech recognition results matches the generated question, determining that the received utterance is directed to a digital assistant.

An example electronic device comprises means for receiving an image, means for generating, based on the image, a question corresponding to a first object in the image, means for retrieving a plurality of speech recognition results based on a received utterance, means for determining whether a speech recognition result of the plurality of speech recognition results matches the generated question, and in accordance with a determination that the speech recognition result of the plurality of speech recognition results matches the generated question, means for determining that the received utterance is directed to a digital assistant.

Determining whether a speech recognition result of the plurality of speech recognition results matches the generated question and in accordance with a determination that the speech recognition result of the plurality of speech recognition results matches the generated question, determining that the received utterance is directed to a digital assistant increases the responsiveness and reliability of the digital assistant. In particular, the digital assistant may more accurately determine when the user is not directing a statement or request to the digital assistant because the user is talking about an object that is not in close proximity or created by the digital assistant. In this way, the digital assistant may correctly determine when the user is directing utterances to the digital assistant allowing the digital assistant to respond when desired and stay dormant when not. Accordingly, overall power consumption (e.g., battery life) of a device is improved as the digital assistant will activate and respond to false positives less often.

An example method includes, at an electronic device having one or more processors and memory, receiving an image, generating, based on the image, a plurality of questions corresponding to a first object in the image, selecting a subset of the plurality of questions corresponding to the first object in the image, and displaying the subset of the plurality of questions corresponding to the first object in the image.

An example non-transitory computer-readable storage medium stores one or more programs. The one or more programs include instruction for receiving an image, generating, based on the image, a plurality of questions corresponding to a first object in the image, selecting a subset of the plurality of questions corresponding to the first object in the image, and displaying the subset of the plurality of questions corresponding to the first object in the image.

An example electronic device comprises one or more processors; a memory; and one or more programs, where the one or more programs are stored in the memory and configured to be executed by the one or more processors, the one or more programs including instructions for receiving an image, generating, based on the image, a plurality of questions corresponding to a first object in the image, selecting a subset of the plurality of questions corresponding to the first object in the image, and displaying the subset of the plurality of questions corresponding to the first object in the image.

An example electronic device comprises means for receiving an image, means for generating, based on the image, a plurality of questions corresponding to a first object in the image, means for selecting a subset of the plurality of questions corresponding to the first object in the image, and means for displaying the subset of the plurality of questions corresponding to the first object in the image.

Displaying a subset of questions corresponding to a first object in the image improves the ability of the digital assistant to provide useful information to the user. In particular, the digital assistant may determine question and information that would be helpful to the user automatically without prompting from the user. This improves the power consumption and battery life of the device as the digital assistant can anticipate questions the user may ask and provide them proactively, resulting in less instances where the digital assistant needs to be invoked.

DESCRIPTION

Figure 1A:
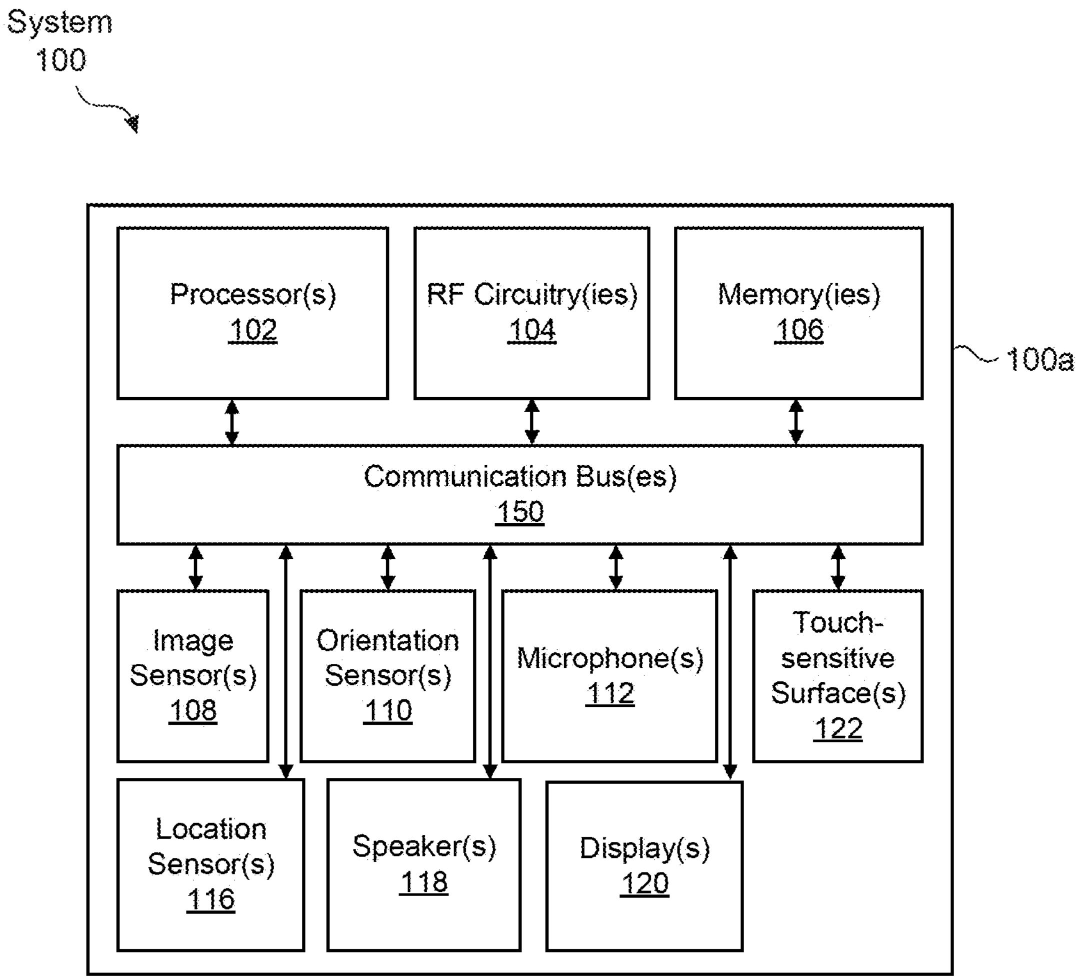
FIGS. 1A-1B depict exemplary systems for use in various computer-generated reality technologies, including virtual reality and mixed reality.

Various examples of electronic systems and techniques for using such systems in relation to various computer-generated reality technologies are described.

A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

In contrast, an extended reality (XR) environment refers to a wholly or partially simulated environment that people sense and/or interact with via an electronic system. In XR, a subset of a person's physical motions, or representations thereof, are tracked, and, in response, one or more characteristics of one or more virtual objects simulated in the XR environment are adjusted in a manner that comports with at least one law of physics. For example, a XR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a XR environment may be made in response to representations of physical motions (e.g., vocal commands).

A person may sense and/or interact with a XR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some XR environments, a person may sense and/or interact only with audio objects.

Examples of XR include virtual reality and mixed reality.

A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground.

Examples of mixed realities include augmented reality and augmented virtuality.

An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.

An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

An augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

There are many different types of electronic systems that enable a person to sense and/or interact with various XR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

Figure 1B:
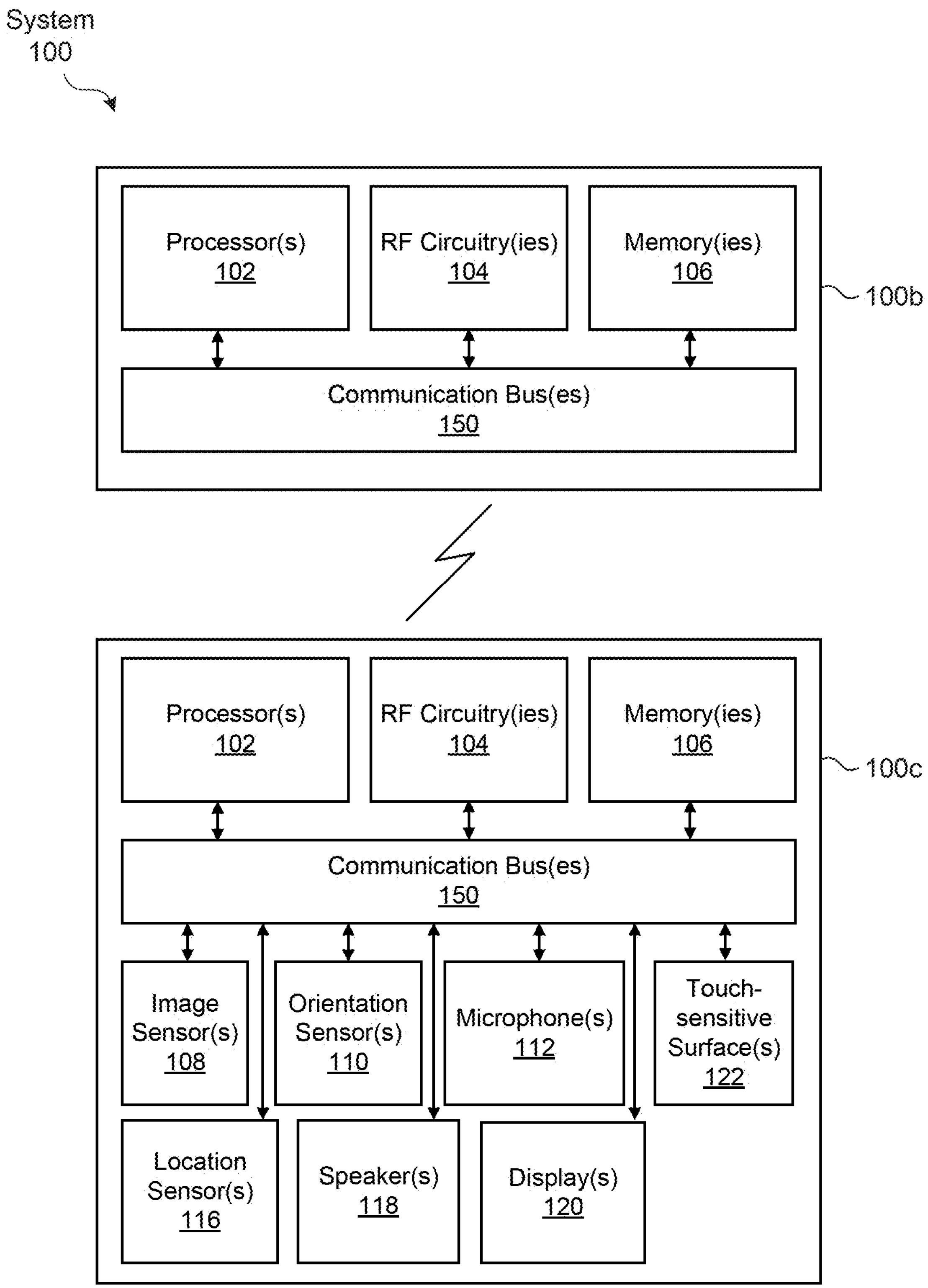

FIG. 1A and FIG. 1B depict exemplary system 100 for use in various computer-generated reality technologies.

In some examples, as illustrated in FIG. 1A, system 100 includes device 100*a*. Device 100*a* includes various components, such as processor(s) 102, RF circuitry(ies) 104, memory(ies) 106, image sensor(s) 108, orientation sensor(s) 110, microphone(s) 112, location sensor(s) 116, speaker(s) 118, display(s) 120, and touch-sensitive surface(s) 122. These components optionally communicate over communication bus(es) 150 of device 100*a*.

In some examples, elements of system 100 are implemented in a base station device (e.g., a computing device, such as a remote server, mobile device, or laptop) and other elements of the system 100 are implemented in a head-mounted display (HMD) device designed to be worn by the user, where the HMD device is in communication with the base station device. In some examples, device 100*a* is implemented in a base station device or a HMD device.

As illustrated in FIG. 1B, in some examples, system 100 includes two (or more) devices in communication, such as through a wired connection or a wireless connection. First device 100*b* (e.g., a base station device) includes processor(s) 102, RF circuitry(ies) 104, and memory(ies) 106. These components optionally communicate over communication bus(es) 150 of device 100*b*. Second device 100*c* (e.g., a head-mounted device) includes various components, such as processor(s) 102, RF circuitry(ies) 104, memory(ies) 106, image sensor(s) 108, orientation sensor(s) 110, microphone(s) 112, location sensor(s) 116, speaker(s) 118, display(s) 120, and touch-sensitive surface(s) 122. These components optionally communicate over communication bus(es) 150 of device 100*c*.

In some examples, system 100 is a mobile device. In some examples, system 100 is a head-mounted display (HMD) device. In some examples, system 100 is a wearable HUD device.

System 100 includes processor(s) 102 and memory(ies) 106. Processor(s) 102 include one or more general processors, one or more graphics processors, and/or one or more digital signal processors. In some examples, memory(ies) 106 are one or more non-transitory computer-readable storage mediums (e.g., flash memory, random access memory) that store computer-readable instructions configured to be executed by processor(s) 102 to perform the techniques described below.

System 100 includes RF circuitry(ies) 104. RF circuitry(ies) 104 optionally include circuitry for communicating with electronic devices, networks, such as the Internet, intranets, and/or a wireless network, such as cellular networks and wireless local area networks (LANs). RF circuitry(ies) 104 optionally includes circuitry for communicating using near-field communication and/or short-range communication, such as Bluetooth®.

System 100 includes display(s) 120. In some examples, display(s) 120 include a first display (e.g., a left eye display panel) and a second display (e.g., a right eye display panel), each display for displaying images to a respective eye of the user. Corresponding images are simultaneously displayed on the first display and the second display. Optionally, the corresponding images include the same virtual objects and/or representations of the same physical objects from different viewpoints, resulting in a parallax effect that provides a user with the illusion of depth of the objects on the displays. In some examples, display(s) 120 include a single display. Corresponding images are simultaneously displayed on a first area and a second area of the single display for each eye of the user. Optionally, the corresponding images include the same virtual objects and/or representations of the same physical objects from different viewpoints, resulting in a parallax effect that provides a user with the illusion of depth of the objects on the single display.

In some examples, system 100 includes touch-sensitive surface(s) 122 for receiving user inputs, such as tap inputs and swipe inputs. In some examples, display(s) 120 and touch-sensitive surface(s) 122 form touch-sensitive display(s).

System 100 includes image sensor(s) 108. Image sensors(s) 108 optionally include one or more visible light image sensor, such as charged coupled device (CCD) sensors, and/or complementary metal-oxide-semiconductor (CMOS) sensors operable to obtain images of physical objects from the real environment. Image sensor(s) also optionally include one or more infrared (IR) sensor(s), such as a passive IR sensor or an active IR sensor, for detecting infrared light from the real environment. For example, an active IR sensor includes an IR emitter, such as an IR dot emitter, for emitting infrared light into the real environment. Image sensor(s) 108 also optionally include one or more event camera(s) configured to capture movement of physical objects in the real environment. Image sensor(s) 108 also optionally include one or more depth sensor(s) configured to detect the distance of physical objects from system 100. In some examples, system 100 uses CCD sensors, event cameras, and depth sensors in combination to detect the physical environment around system 100. In some examples, image sensor(s) 108 include a first image sensor and a second image sensor. The first image sensor and the second image sensor are optionally configured to capture images of physical objects in the real environment from two distinct perspectives. In some examples, system 100 uses image sensor(s) 108 to receive user inputs, such as hand gestures. In some examples, system 100 uses image sensor(s) 108 to detect the position and orientation of system 100 and/or display(s) 120 in the real environment. For example, system 100 uses image sensor(s) 108 to track the position and orientation of display(s) 120 relative to one or more fixed objects in the real environment.

In some examples, system 100 includes microphones(s) 112. System 100 uses microphone(s) 112 to detect sound from the user and/or the real environment of the user. In some examples, microphone(s) 112 includes an array of microphones (including a plurality of microphones) that optionally operate in tandem, such as to identify ambient noise or to locate the source of sound in space of the real environment.

System 100 includes orientation sensor(s) 110 for detecting orientation and/or movement of system 100 and/or display(s) 120. For example, system 100 uses orientation sensor(s) 110 to track changes in the position and/or orientation of system 100 and/or display(s) 120, such as with respect to physical objects in the real environment. Orientation sensor(s) 110 optionally include one or more gyroscopes and/or one or more accelerometers.

Figure 2:
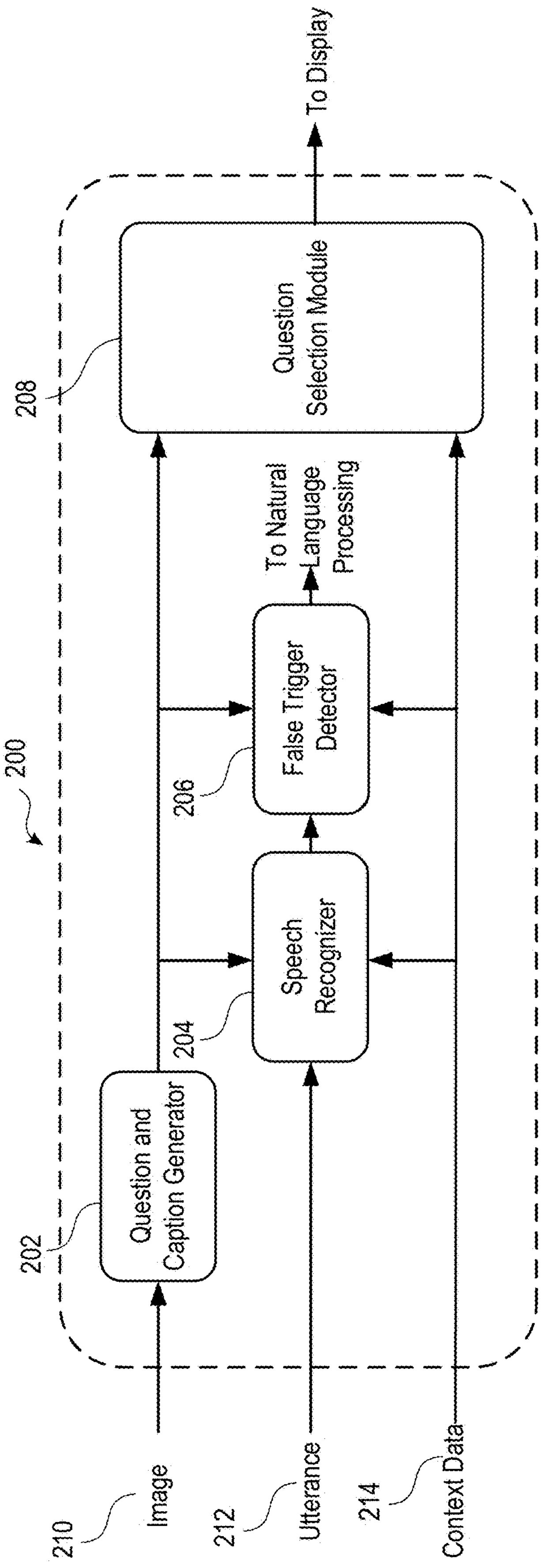
FIG. 2 depicts exemplary digital assistant 200 for processing images related to user input, according to various examples.

FIG. 2. depicts exemplary digital assistant 200 for processing images related to user input, according to various examples. In some examples, as illustrated in FIG. 2, digital assistant 200 includes question and caption generator 202, speech recognizer 204, false trigger detector 206, and question selection module 208. In some examples, these components or modules of digital assistant 200 may optionally be combined as discussed further below. In some examples, digital assistant 200 is implemented on electronic device 100. In some examples, digital assistant 200 is implemented across other devices (e.g., a server) in addition to electronic device 100. In some examples, some of the modules and functions of the digital assistant are divided into a server portion and a client portion, where the client portion resides on one or more user devices (e.g., electronic device 100) and communicates with the server portion through one or more networks.

It should be noted that digital assistant 200 is only one example of a digital assistant, and that digital assistant 200 can have more or fewer components than shown, can combine two or more components, or can have a different configuration or arrangement of the components. The various components shown in FIG. 2 are implemented in hardware, software instructions for execution by one or more processors, firmware, including one or more signal processing and/or application specific integrated circuits, or a combination thereof. In some examples, digital assistant 200 connects to one or more components and/or sensors of electronic device 100 as discussed further below.

Digital assistant 200 receives image 210, utterance 212, and context data 214 and processes these inputs using question and caption generator 202, speech recognizer 204, false trigger detector 206, and question selection module 208 to perform various tasks and provide a user with more accurate responses and generated actions to increase the user's enjoyment of digital assistant 200.

Digital assistant 200 receives image 210 and provides image 210 to question and caption generator 202. In some examples, image 210 is received through one or more sensors of electronic device 100 such as image sensors 108 (e.g., one or more cameras). In some examples, image 210 includes a view of electronic device 100. For example, when electronic device 100 is a head mounted device, digital assistant 200 may receive image 210 from a camera of electronic device 100 as a view of electronic device 100 that mirror's the user's view. As another example, when electronic device 100 is a smart phone, digital assistant 200 may receive image 210 from a camera of electronic device 100 as a view of electronic device 100.

In some examples, image 210 includes one or more objects. For example, image 210 may include one or more objects that electronic device 100 is pointed at and/or one or more objects that are in the field of view of a camera of electronic device 100. In some examples, the view of electronic device 100 includes virtual objects or augmented objects. For example, when electronic device 100 is a head mounted device, the view of electronic device 100 may include virtual objects that are being created and shown to the user. In some examples, the view of electronic device 100 includes real objects. For example, as described above, the view of electronic device 100 may be received from one or more cameras of electronic device 100 that are capturing a real environment and thus include real objects. Accordingly, image 210 received by digital assistant 200 may include both real and virtual objects.

Figure 3:
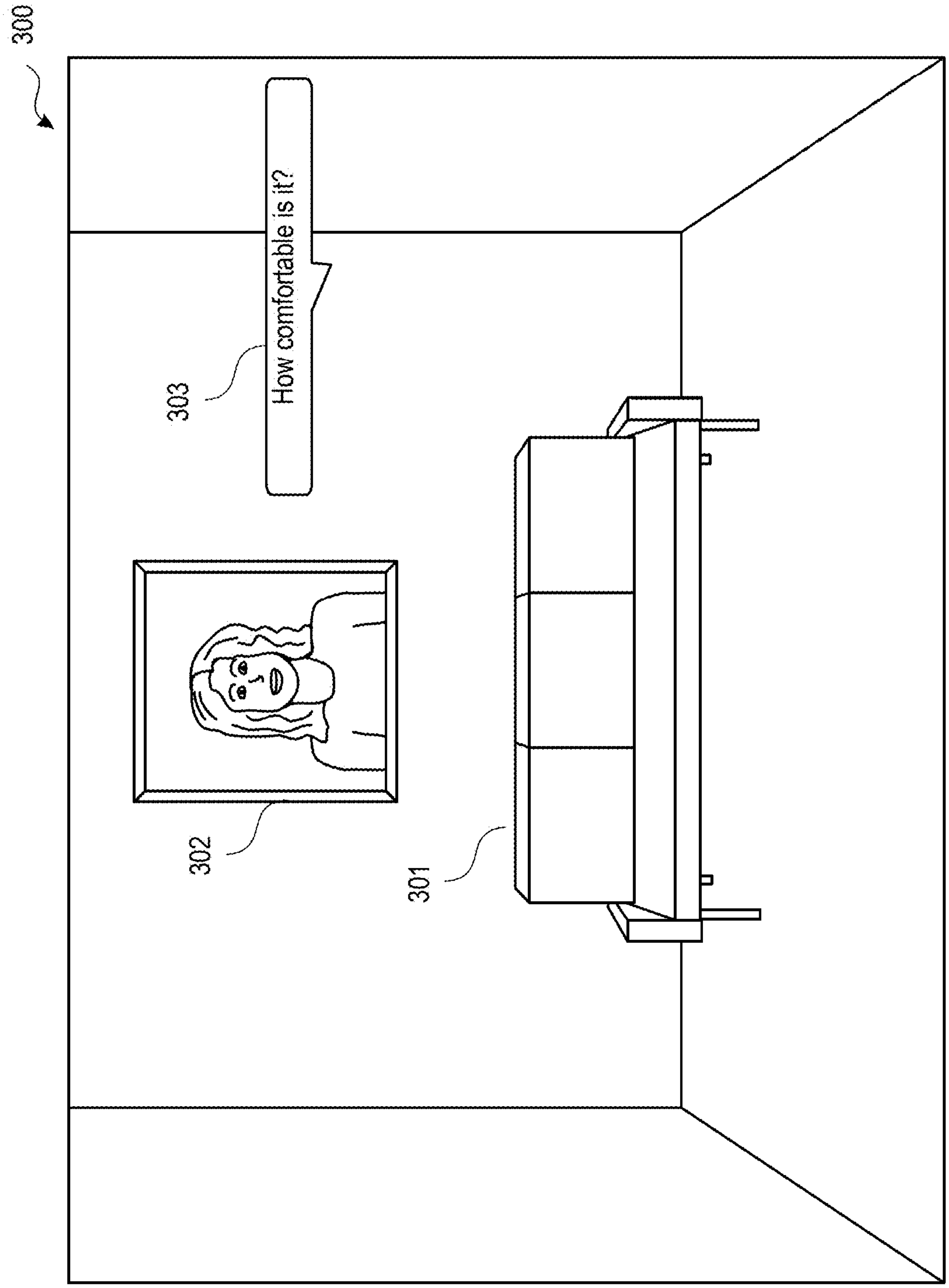
FIG. 3 depicts an example view of an electronic device received by a digital assistant.

In some examples, receipt of image 210 is triggered by receiving utterance 212. For example, digital assistant 200 may receive utterance 303 of "How comfortable is it?" as shown in FIG. 3. Accordingly, digital assistant 200 may trigger receipt of image 300 including the objects 301 and 302. In other examples, digital assistant 200 receives image 210 automatically and updates image 210 in real time. For example, digital assistant 200 may receive image 300 of a room including objects like furniture, paintings, and others and update image 300 as the user looks around the room. Thus, digital assistant 200 may have already received image 300 when utterance 303 of "How comfortable is it?" is received.

After question and caption generator (QCG) 202 receives image 210, question and caption generator 202 automatically generates a plurality of questions and a plurality of captions that correspond to image 210. For example, when QCG 202 receives image 300, QCG 202 may generate the questions "who is that?" "who painted that?" "how much is that?" "where is it from?," etc. and the captions "painting hanging over a couch," "couch under a painting," "a living room with a couch and a painting," etc. based on the objects included in image 300.

In some examples, QCG 202 is a neural network trained to generate questions and captions based on a received image. In some examples, QCG 202 is a neural network comprised of a plurality of long short-term memory blocks or other recurrent neural network components. In some examples, QCG 202 is a neural network comprised of a plurality of multi-modal transformers.

In some examples, QCG 202 is trained by providing QCG 202 with a set of images, a set of questions corresponding to each image, and a set of captions corresponding to each image. In some examples, QCG 202 is trained by providing QCG 202 with a first image, a first set of questions corresponding to the first image, and a first set of captions corresponding to the first image. Further, QCG 202 may be provided iteratively with a second image, a second set of questions corresponding to the second image, a second set of captions corresponding to the second image, and so on. Accordingly, QCG 202 may be trained with a series of images and the corresponding questions and captions to generate questions and captions corresponding to an image when an image is received.

In some examples, QCG 202 generates, based on image 210, a question corresponding to a first object in image 210. For example, QCG 202 may generate the question "who painted that?" corresponding to object 302 in image 300. In some examples, QCG 202 generates, based on image 210, a caption corresponding to a second object in image 210. For example, QCG 202 may generate the caption "a couch in a room" corresponding to object 301 in image 300. Accordingly, in some examples, the first object and the second object are different objects that are both included in image 210.

In some examples, after QCG 202 generates the set of questions based on image 210 QCG 202 determines a probability score for each of the questions that measures the applicability of the question. In some examples, the probability score is indicative of whether a question of the set of questions is a question that a user would ask about an object of image 210. Thus, QCG 202 determines a first probability score for a first question of the set of questions indicative of whether the first question is a question the user would ask and a second probability score for a second question of the set of questions indicative of whether the second question is a question the user would ask. In some examples, QCG 202 then determines whether the first probability score or the second probability score is higher and selects the question with the higher corresponding score. Accordingly, QCG 202 selects a subset of the questions to be provided for further processing based on the determined scores.

In some examples, QCG 202 determines a probability score for each question of the set of questions and selects the top scoring question. For example, when QCG 202 generates the questions "who is that?" "who painted that?" "how much is that?" "where is it from?," based on image 300 as discussed above, QCG 202 may determine scores for each of the questions based on how useful they may be and select "who painted that?" as the top scoring question.

In some examples, QCG 202 selects a predetermined number of the top scoring questions. For example, when QCG 202 generates the questions "who is that?" "who painted that?" "how much is that?" "where is it from?," based on image 300 as discussed above, QCG 202 may select the top three scoring questions of "who painted that?" "who is that?" and "where is it from?" In some examples, QCG 202 selects a predetermined number of unique questions. For example, QCG 202 may generate the questions "who painted that?" and "who made that?" and thus may determine that these two questions are essentially asking for the same information and thus are not unique. Accordingly, QCG 202 may select "who painted that?" rather than "who made that?" because "who painted that?" is associated with a higher score and only unique questions are selected. In some examples, QCG 202 determines how to select the subset of questions based on how many unique questions each selection method may provide.

Similarly, in some examples, after QCG 202 generates the set of captions based on image 210, QCG 202 determines a probability score for each of the captions that measures the applicability of each of the captions. Thus, QCG 202 determines a first probability score for a first caption of the set of captions indicative of whether the first caption is a caption the user would ask and a second probability score for a second caption of the set of captions indicative of whether the second caption is a caption the user would ask. In some examples, QCG 202 then determines whether the first probability score or the second probability score is higher and selects the caption with the higher corresponding score. Accordingly, QCG 202 selects a subset of the captions to be provided for further processing based on the determined scores.

In some examples, QCG 202 determines a probability score for each caption of the set of captions and selects the top scoring caption. For example, when QCG 202 generates the captions "painting hanging over a couch," "couch under a painting," "a living room with a couch and a painting," and "room with painting," based on image 300 as discussed above, QCG 202 may determine scores for each of the captions based on how useful they may be and select "painting hanging over a couch" as the top scoring caption.

In some examples, QCG 202 selects a predetermined number of the top scoring captions. For example, when QCG 202 generates the questions "painting hanging over a couch," "couch under a painting," "a living room with a couch and a painting," and "room with painting," based on image 300 as discussed above, QCG 202 may select the top three scoring captions of "painting hanging over a couch," "couch under a painting," and "a living room with a couch and a painting." In some examples, QCG 202 selects a predetermined number of unique captions. For example, QCG 202 may generate the captions "painting hanging over a couch," and "couch under a painting," and thus may determine that these two captions are providing the same information and thus are not unique. Accordingly, QCG 202 may select "painting hanging over a couch," rather than "painting hanging over a couch," because "painting hanging over a couch," is associated with a higher score and only unique captions are selected. In some examples, QCG 202 determines how to select the subset of captions based on how many unique captions each selection method may provide.

In some examples, QCG 202 generates, based on image 210, a question corresponding to a first object in image 210. For example, QCG 202 may generate the question "who painted that?" corresponding to object 302 in image 300. In some examples, QCG 202 generates, based on image 210, a caption corresponding to a second object in image 210. For example, QCG 202 may generate the caption "a couch in a room" corresponding to object 301 in image 300. Accordingly, in some examples, the first object and the second object are different objects that are both included in image 210.

In some examples, a question generated by QCG 202 corresponds to both the first object and the second object. For example, QCG 202 may generate the question "what is the painting hanging over the couch?" which corresponds to both objects 301 and 302 of image 300. Similarly, in some examples, a caption generated by QCG 202 corresponds to both the first object and the second object. For example, QCG 202 may generate the caption "painting hanging over a couch," which corresponds to both objects 301 and 302 of image 300.

In some examples, the first object and the second object are the same object of image 210. For example, QCG 202 may generate both a question and a caption that correspond to object 301 such as "what colors do they make that?" and "a living room couch." Thus, in this example, the first object and the second object are both the couch 301 included in image 300.

In some examples, as shown in FIG. 2, digital assistant 200 receives utterance 212. In some examples, utterance 212 is received near in time to image 210. Accordingly, in some examples, digital assistant 200 processes image 210 and utterance 212 simultaneously or nearly simultaneously. In this way digital assistant 200 may operate in real time to respond to user requests and determine questions or information to provide to the user.

In some examples, after receiving utterance 212, digital assistant 200 provides utterance 212 to speech recognizer 204. Speech recognizer 204 then determines a set of speech recognition results from utterance 212. In some examples, determining a set of speech recognition results from utterance 212 includes performing a semantic analysis on utterance 212. In some examples, performing the semantic analysis includes performing automatic speech recognition (ASR) on utterance 212. In particular, speech recognizer 204 can include one or more ASR systems that process utterance 212 received through input devices (e.g., a microphone) of electronic device 100. The ASR systems extract representative features from the speech input. For example, the ASR systems pre-processor performs a Fourier transform on utterance 212 to extract spectral features that characterize the speech input as a sequence of representative multi-dimensional vectors.

Further, each ASR system of speech recognizer 204 includes one or more speech recognition models (e.g., acoustic models and/or language models) and implements one or more speech recognition engines. Examples of speech recognition models include Hidden Markov Models, Gaussian-Mixture Models, Deep Neural Network Models, n-gram language models, and other statistical models. Examples of speech recognition engines include the dynamic time warping based engines and weighted finite-state transducers (WFST) based engines. The one or more speech recognition models and the one or more speech recognition engines are used to process the extracted representative features of the front-end speech pre-processor to produce intermediate recognition results (e.g., phonemes, phonemic strings, and sub-words), and ultimately, speech recognition results (e.g., words, word strings, or sequence of tokens).

In some examples, speech recognizer 204 determines the set of speech recognition results from utterance 212 based on a question or set of questions determined by QCG 202. Speech recognizer 204 determines the set of speech recognition results from utterance 212 based on the question by biasing a language model of speech recognizer 204 with the question determined by QCG 202. Speech recognizer 204 may then determine the set of speech recognition results using the biased language model of speech recognizer 204.

For example, QCG 202 may generate the question "what is it made of?" corresponding to object 301 of image 300. Accordingly, speech recognizer 204 may bias one of speech recognizer 204's language models with the question "what is it made of?" Thus, when speech recognizer 204 receives utterance 303 of "How comfortable is it?" the biased language model of speech recognizer 204 may determine a set of speech recognition results related to object 301 such as "who made it?" "how soft is it?" etc. In this way, speech recognizer 204 may more readily provide speech recognition results related to an object referenced by utterance 303 because the question determined by QCG 202 and used to bias the language model of speech recognizer 204 is related to the same object.

In some examples, speech recognizer 204 determines the set of speech recognition results from utterance 212 based on a caption or set of captions determined by QCG 202. Speech recognizer 204 determines the set of speech recognition results from utterance 212 based on the caption by adding vocabulary to a language model of speech recognizer 204 based on the caption determined by QCG 202. Speech recognizer 204 may then determine the set of speech recognition results using the language model of speech recognizer 204 including the new vocabulary.

For example, QCG 202 may generate the caption "a painting by Leonardo Da Vinci over a couch," corresponding to object 302 of image 300. Accordingly, speech recognizer 204 may incorporate the vocabulary "Leonardo Da Vinci," into a language model of speech recognizer 204 upon receipt of the generated caption. Thus, when speech recognizer 204 receives an utterance of "what else did Leonardo Da Vinci paint?" the language model of speech recognizer 204 may understand the name "Leonardo Da Vinci," as used in the utterance. In this way, speech recognizer 204 may more readily provide the correct speech recognition result because it includes the vocabulary used in utterance 212, even if speech recognizer 204 previously did not include or understand that vocabulary (e.g., Leonardo Da Vinci).

In some examples, speech recognizer 204 determines the set of speech recognition results from the utterance based on a question or a set of questions and a caption or set of captions determined by QCG 202. Thus, speech recognizer 204 incorporates the question(s) and the caption(s) provided by QCG 202 as discussed above, using the question(s) to bias the language model and using the caption(s) to add vocabulary to the language model. Accordingly, the same language model may be improved through the incorporation of the questions and the captions to provide a more accurate set of speech recognition results when processing utterance 212.

This process is repeated for each of the questions and captions generated by QCG 202, allowing speech recognizer 204 to adapt and incorporate a plurality of questions and captions to provide better speech recognition results based on utterance 212. In this way, the responsiveness of digital assistant 200 is improved by using image 210 (or a series of images) to update speech recognizer 204 in real time without requiring additional individual training on specific topics or objects.

After generating the set of speech recognition results, speech recognizer 204 determines a speech recognition confidence score for each of the speech recognition results. Speech recognizer 204 then ranks the speech recognition results based on the corresponding speech recognition confidence scores and selects the speech recognition result with the highest speech recognition confidence score. The selected speech recognition score is then provided by speech recognizer 204 for natural language processing. In some examples, based on the speech recognition confidence scores, speech recognizer 204 ranks the speech recognition results and provides the n-best (e.g., n highest ranked) speech recognition result(s) to other modules of digital assistant 200 for further processing.

In some examples, digital assistant 200 receives context data 214 and provides context data 214 to speech recognizer 204. Context data 214 includes context data associated with the electronic device (e.g., electronic device 100) on which digital assistant 200 is operating. Context data associated with the electronic device includes various characteristics of the electronic device. For instance, context data may indicate a location of the electronic device (e.g., GPS coordinates, an indication of which room in a house the device is in, location relative to another device or person), whether the electronic device is connected to a network (e.g., WiFi network), whether the electronic device is connected to one or more other devices (e.g., headphones), and/or a current time, date, and/or weekday. If the electronic device is connected to a network or device, the context data may further indicate a name and/or type of the network or device, respectively. Context data 214 may further include objects currently being displayed by electronic device 100, either on a screen or as part of a virtual environment as discussed above.

Speech recognizer 204 may utilize the received context data 214 as part of calculating the speech recognition confidence scores and thus, may consider context data 214 when determining which speech recognition results to provide for further processing (e.g., natural language processing). In one example, speech recognizer 204 compares one or more objects referenced by each of the speech recognition results to data displayed by electronic device 100 that is received as context data 214. Speech recognizer 204 then selects one or more speech recognition results that reference an object included in the data displayed on the user interface.

For example, speech recognizer 204 may determine a speech recognition result of "how comfortable is it," and determine that context data 214 includes data indicating that a virtual couch is being displayed by electronic device 100. Accordingly, speech recognizer 204 may select the speech recognition result "how comfortable is it," because this question references the virtual object (e.g., the couch) that electronic device 100 is currently displaying.

In some examples, after one or more speech recognition results are selected by speech recognizer 204, false trigger detector 206 retrieves the set of selected speech recognition results determined based on utterance 212. False trigger detector 206 further receives the one or more questions and one or more captions generated by QCG 202 based on image 210. Accordingly, false trigger detector 206 uses the set of selected speech recognition results, the one or more questions, and the one or more captions to determine whether utterance 212 is directed to digital assistant 200.

In some examples, false trigger detector 206 determines whether utterance 212 is directed to digital assistant 200 by determining whether a speech recognition result of the set of speech recognition results matches a question of the set of questions. For example, when the speech recognition result determined by speech recognizer 204 from utterance 303 is "how comfortable is it?" and the question determined by QCG 202 from image 300 is also "how comfortable is it?," false trigger detector 206 may determine that the speech recognition result matches the question.

In some examples, false trigger detector 206 determines whether utterance 212 is directed to digital assistant 200 by determining whether an object referenced by the speech recognition result of the set of speech recognition results matches an object referenced by the caption of the set of captions. For example, when the speech recognition result determined by speech recognizer 204 from utterance 303 is "how comfortable is it?" and the caption determined by QCG 202 from image 300 is "a couch in a living room," false trigger detector 206 may determine that the object referenced by the speech recognition result matches the object referenced by the caption because both reference object 301 (the couch) of image 300.

In contrast, when the speech recognition result determined by speech recognizer 204 from utterance 303 is "how comfortable is it?" and the caption determined by QCG 202 from image 300 is "a painting hanging on a wall," false trigger detector 206 may determine that the object referenced by the speech recognition result does not match the object referenced by the caption because the object referenced by the speech recognition result is object 301 (the couch) while the object referenced by the caption is object 302 (the painting).

In some examples, false trigger detector 206 determines whether utterance 212 is directed to digital assistant 200 by determining whether an attribute of the object referenced by the speech recognition result of the set of speech recognition results matches an attribute of the object referenced by the caption of the set of captions. For example, when the speech recognition result determined by speech recognizer 204 from utterance 303 is "how comfortable is it?" and the caption determined by QCG 202 from image 300 is "a couch in a living room," false trigger detector 206 may determine that an attribute of the object referenced by the speech recognition result is "level of comfort," and, because the caption also references the couch, may also determine that an attribute of the object referenced by the caption is "level of comfort." Thus, false trigger detector 206 may determine that the attributes of the objects referenced by the speech recognition result and the caption are the same.

In contrast, when the speech recognition result determined by speech recognizer 204 is "how fast is it?" and the caption determined by QCG 202 from image 300 is "a couch in a living room," false trigger detector 206 may determine that an attribute of the object referenced by the speech recognition result is "speed," and may determine that an attribute of the object referenced by the caption is "level of comfort." Thus, false trigger detector 206 may determine that the attributes of the objects referenced by the speech recognition result and the caption do not match. Accordingly, false trigger detector 206 may determine that the received utterance is not directed to digital assistant 200 as discussed in more detail below.

In some examples, false trigger detector 206 determines whether utterance 212 is directed to digital assistant 200 by determining whether an object referenced by the speech recognition result of the set of speech recognition results matches an object referenced by the question. For example, when the speech recognition result determined by speech recognizer 204 from utterance 303 is "how comfortable is it?" and the question determined by QCG 202 from image 300 is "how soft is it?," false trigger detector 206 may determine that the object referenced by the speech recognition result and the object referenced by the question are the same object because both reference object 301 (the couch).

In some examples, false trigger detector 206 determines whether utterance 212 is directed to digital assistant 200 by determining whether an attribute of the object referenced by the speech recognition result of the set of speech recognition results matches an attribute of the object referenced by the question. For example, when the speech recognition result determined by speech recognizer 204 from utterance 303 is "how comfortable is it?" and the question determined by QCG 202 from image 300 is "how soft is it?," false trigger detector 206 may determine that the attribute of the object referenced by both the speech recognition result and the question is the "level of comfort" of object 301 (the couch).

In some examples, false trigger detector 206 comprises a neural network. In some examples, false trigger detector 206 comprises a plurality of long short-term memory cells that process the speech recognition results, the questions, and the captions. In some examples, false trigger detector 206 is trained to determine whether the speech recognition result matches the question by being trained to determine an embedding based on the generated question and an embedding based on the speech recognition result and comparing a distance between the embeddings. In some examples, the neural network of false trigger detector 206 is trained prior to receiving utterance 212.

In some examples, false trigger detector 206 determines whether a speech recognition result of the set of speech recognition results matches a question of the set of questions by providing the generated question and the speech recognition result to the neural network included in false trigger detector 206. The neural network of false trigger detector 206 then determines at least two embeddings, one corresponding to the generated question and one corresponding to the speech recognition result. False trigger detector 206 determines a distance between the two embeddings and determines whether the distance between the embeddings is below a similarity threshold. When the distance between the embeddings is below the similarity threshold, false trigger detector 206 determines that the speech recognition result and the question are the same and thus that utterance 212 is directed to digital assistant 200.

For example, when the speech recognition result determined by speech recognizer 204 from utterance 303 is "how comfortable is it?" and the question determined by QCG 202 from image 300 is also "how comfortable is it?," false trigger detector 206 may determine that the distance between the embeddings corresponding to the speech recognition result and the question is relatively small. Thus, false trigger detector 206 may determine that the determined small distance is below the similarity threshold and thus that the speech recognition result and the question are the same and/or very similar. As another example, when the speech recognition result determined by speech recognizer 204 from utterance 303 is "how comfortable is it?" and the question determined by QCG 202 from image 300 is "who painted that?" false trigger detector 206 may determine that the distance between the embeddings corresponding to the speech recognition result and the question is relatively large. Thus, false trigger detector 206 may determine that the determined large distance is above the similarity threshold and thus that the speech recognition result and the question are not the same and/or are not very similar.

Once false trigger detector 206 determines that the question matches the speech recognition result, that an object referenced by the caption matches an object referenced by the speech recognition result, that an object referenced by the question matches an object referenced by the speech recognition result, or that an attribute of the object referenced by the question/caption matches an attribute of the object referenced by the speech recognition result false trigger detector 206 determines that utterance 212 is directed to digital assistant 200. Conversely, if false trigger detector 206 determines that the question does not match the speech recognition result or that the object referenced by the caption does not match the object referenced by the speech recognition result, false trigger detector 206 determines that utterance 212 is not directed to digital assistant 200.

In some examples, when false trigger detector 206 determines that utterance 212 is not directed to digital assistant 200, digital assistant 200 disregards utterance 212. For example, when the speech recognition result determined by speech recognizer 204 from utterance 303 is "how comfortable is it?" and the caption determined by QCG 202 from image 300 is "a painting hanging on a wall," false trigger detector 206 may determine that utterance 212 is not directed to digital assistant 200 and thus digital assistant 200 may ignore utterance 212. Accordingly, digital assistant 200 may stop processing of utterance 212 and may not respond to the user or provide the user with any information.

In some examples, false trigger detector 206 repeats this process for each speech recognition result of the set of recognition results. For example, after performing the process discussed above for the speech recognition result "how comfortable is it?" false trigger detector 206 may compare the speech recognition results "who made it?" "who painted that?" and "where can I get one?" to the various questions and captions provided by QCG 202 based on image 210. Accordingly, false trigger detector 206 may determine whether any of these speech recognition results (or any others determined by speech recognizer 204) match or are similar to any of the questions or captions.

In some examples, false trigger detector 206 repeats this process for each question of the set of questions. For example, after performing the process discussed above for the question "how soft is it?" false trigger detector 206 may compare the questions "what else did they paint?" "who makes this?" and "where is made?" to the speech recognition result "how comfortable is it?" to determine whether any of these questions match or are similar to the speech recognition result. Similarly, false trigger detector 206 repeats this process for each caption of the set of captions. For example, after performing the process discussed above for the "couch in a living room" false trigger detector 206 may compare the captions "painting over a couch" and "painting hanging in a room" to the speech recognition result "how comfortable is it?" to determine whether any of these captions match or are similar to the speech recognition result.

It should be understood that false trigger detector 206 can evaluate any number of speech recognition results received from speech recognizer 204 based on utterance 212 in combination with any number of questions and captions received from QCG 202 based on image 210. In this way, false trigger detector 206 may iteratively process the different possible combinations in order to provide a more accurate determination of whether utterance 212 is directed to digital assistant 200 and thus whether digital assistant 200 should respond to a user.

In some examples, false trigger detector 206 determines that utterance 212 is directed to digital assistant 200 based on context data 214. In some examples, false trigger detector 206 determines that utterance 212 is directed to digital assistant 200 based on a user gaze included in context data 214. For example, when false trigger detector 206 receives the speech recognition result "how comfortable is it?" false trigger detector 206 may also receive context data 214 indicating that the user is looking at object 301. Accordingly, false trigger detector 206 may determine that the user is directing utterance 303 to digital assistant 200. In some examples, false trigger detector 206 determines that utterance 212 is directed to digital assistant 200 based on a user gesture included in context data 214. For example, when false trigger detector 206 receives the speech recognition result "how comfortable is it?" false trigger detector 206 may also receive context data 214 indicating that the user is pointing at object 301. Accordingly, false trigger detector 206 may determine that the user is directing utterance 303 to digital assistant 200.

In some examples, false trigger detector 206 determines that utterance 212 is directed to digital assistant 200 based on context data 214 as well as the determinations of whether the speech recognition results matches the questions and/or the captions as discussed above. In this way, false trigger detector 206 may increase the accuracy of its determinations by considering context data 214 and thus may increase the responsiveness of digital assistant 200.

In some examples, when false trigger detector 206 determines that utterance 212 is directed to digital assistant 200, false trigger detector 206 provides the speech recognition result for further processing including natural language processing, as discussed above. In some examples, digital assistant 200 determines one or more possible natural language results based on the speech recognition result.

Figure 4:
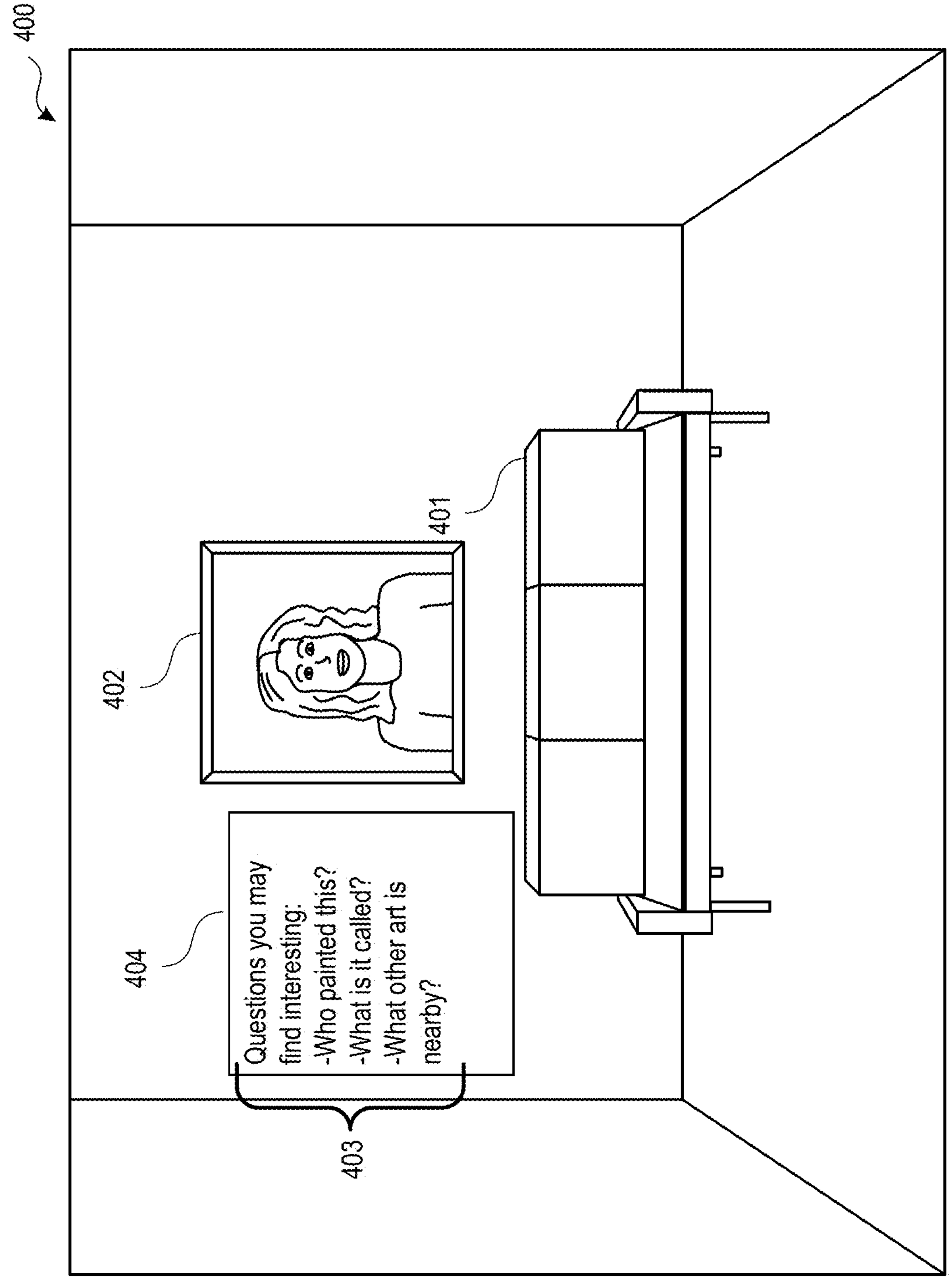
FIG. 4 depicts an example view of an electronic device received by a digital assistant.

As shown in FIG. 2, in some examples, QCG 202 provides the questions generated based on image 210 to question selection module 208. Question selection module 208 then selects a subset of the questions corresponding to an object in image 210 and provides the subset of questions to a user. For example, as shown in FIG. 4, QCG 202 receives image 400 and generates a set of questions about object 402 and provides them to question selection module 208. Question selection module 208 then selects the subset of questions 403 and provides them as object 404.

In some examples, question selection module 208 and QCG 202 select an object of image 210 for generating the set of questions based on context data 214. In some examples, question selection module 208 and QCG 202 select the object of image 210 for generating the set of questions based on a gaze of a user included in context data 214. For example, context data 214 may include data indicating that the user is looking at object 402 (e.g., based on a camera of electronic device 100) and not at object 401. Accordingly, question selection module 208 and QCG 202 select object 402 and not object 401 to determine a set of questions for based on the user's gaze.

In some examples, question selection module 208 and QCG 202 select the object of image 210 for generating the set of questions based on a length of time of a gaze of a user included in context data 214. For examples, when context data 214 includes the data indicating the user is looking at object 402, digital assistant 200 may determine the length of time that the user is looking at object 402. In accordance with a determination that the length of time that the user is looking at object 402 exceeds a predetermined threshold (e.g., 1 second, 5 seconds, or 10 seconds), question selection module 208 and QCG 202 may select object 402 of image 400 for generating a set of questions.

In some examples, question selection module 208 and QCG 202 select the object of image 210 for generating the set of questions based on a location of electronic device 100 included in context data 214. For example, context data 214 may include data indicating that electronic device 100 is located in art museum when digital assistant receives image 400 including objects 401 and 402. Accordingly, question selection module 208 and QCG 202 may select object 402 for generating a set of questions because object 402 is determined to be more relevant to the location of electronic device 100.

In some examples, question selection module 208 and QCG 202 select multiple objects of image 210 for generating multiple sets of questions. For example, question selection module 208 and QCG 202 may select both objects 401 and 402 for generating questions. Accordingly, QCG 202 may determine a set of questions for object 401 and a set of questions for object 402 and provide them to question selection module 208 which may then select a subset of questions from each of the set of questions corresponding to object 401 and 402, as described below.

After selecting the object of image 210, QCG 202 generates a set of questions corresponding to the object in image 210 and provides the set of questions to question selection module 208. QCG 202 generates the set of questions corresponding to the object in image 210 as discussed above. In some examples, QCG 202 generates multiple sets of questions, each set of questions corresponding to a different object of image 210, as discussed above.

Once question selection module 208 receives the set of questions corresponding to the object in image 210 question selection module 208 selects a subset of the set of questions corresponding to the object. In some examples, question selection module 208 selects the subset of the set of questions by determining a weight corresponding to each question of the set of questions, ranking the questions of the set of questions based on the corresponding weights, and determining a predetermined number of the set of questions based on the ranking. For example, question selection module 208 may receive the questions "who painted this?" "what else did the artist make?" "what other art is nearby?" "what is it called?" and "where is this from?" corresponding to object 402 of image 400 from QCG 202. Question selection module 208 may then calculate weights for each of those questions and rank them from highest score to lowest score as "who painted this?" "what is it called?" "what other art is nearby?" "where is this from?" and "what else did the artist make?" and select the top three questions based on the ranking.

In some examples, the weights corresponding to each of the questions are an indication of the relevant of the question. In particular, question selection module 208 may consider various factors discussed below to determine whether a question will be pertinent or important to a user of electronic device 100 that is looking at an object of image 210. In some examples, the weights corresponding to each of the questions are based on context data 214. For example, when context data 214 includes data indicating that electronic device 100 is located in an art museum question selection module 208 may determine that questions related to the art museum such as "what other art is nearby?" will be more helpful or applicable to a user of electronic device 100.

In some examples, the weights corresponding to each of the questions are based on interaction history between the user and digital assistant 200. For example, question selection module 208 may receive data indicating that the user often asks digital assistant 200 questions related to who made specific objects and thus may weight objects like "who painted this?" higher than other questions because the user is likely to find those types of questions applicable or interesting.

In some examples, the weights corresponding to each of the questions are based on the popularity of the question with a set of users. For example, question selection module 208 may receive data indicating that the certain questions are often selected by various users of digital assistant 200. Thus, question selection module 208 may weight those questions higher than other questions because a user is likely to find those questions applicable because other users find those questions applicable.

After selection module 208 selects the subset of questions, selection module 208 provides the subset of questions for display by electronic device 100. In some examples, the subset of questions are provided for display on a touch sensitive display of electronic device 100. For example, when electronic device 100 is a mobile device, digital assistant 200 may provide the subset of questions on a display of the mobile device. In some examples, digital assistant 200 provides the subset of questions in a user interface for digital assistant 200.

In some examples, the subset of questions are provided for display as a virtual object by electronic device 100. For example, when image 400 is a view of a wearable electronic device, digital assistant 200 may provide virtual object 404 in the view of the wearable electronic device. In this way the user may interact with the real objects 401 and 402 and also view virtual object 404 and the information provided in virtual object 404 at the same time. As another example, when image 400 is a view of a portable electronic device such as a cell phone, digital assistant 200 may provide an object on a screen of the cell phone that includes the same information. Thus, the subset of questions may be displayed by many different embodiments of electronic device 100.

In some examples, after displaying the subset of questions corresponding to the object, digital assistant 200 detects selection of a question of the subset of questions. In response to detecting the select of the question, digital assistant 200 determines information about the object corresponding to the question and provides the information about the object. For example, a user may provide the spoken input "who painted this?" as selection of the question "who painted this?" in virtual object 404. As another example, the user may provide a gesture towards the question "who painted this?" in virtual object 404 to select the question. When the questions are provided on a touch sensitive display of a mobile device, digital assistant 200 may receive a tap on the question "who painted this?" as selection of the questions. After receiving each of these selections digital assistant 200 may determine information about who painted object 402 (e.g., by performing an internet search) and providing that information in the same display as the subset of questions 403.

In some examples, digital assistant 200 provides the information about the object as an audible output. For example, digital assistant 200 may provide the audible output "this was painted by Leonardo Da Vinci," after receiving selection of the question "who painted this?" In some examples, digital assistant 200 provides the information about the object as a virtual object. For example, digital assistant 200 may provide the information "this was painted by Leonardo Da Vinci," in virtual object 404 or in a separate virtual object. In some examples, digital assistant 200 provides the information about the object on a touch sensitive display of electronic device 100. For example, digital assistant 200 may provide the information "this was painted by Leonardo Da Vinci," in a user interface corresponding to digital assistant 200.

In some examples, the information about the object references contextual data 214. For example, question selection module 208 may receive contextual data 214 indicating the current location of electronic device 100 as well as other points of interest near the current location of electronic device 100. Accordingly, question selection module 208 may provide the other points of interest near the current location of electronic device 100 in response to selection of the question "what other art is nearby?" In some examples, question selection module 208 provides the information that reference contextual data 214 regardless of selection of one of the questions. For example, digital assistant 200 may provide another virtual object including the points of interest near the current location of electronic device 100 along with virtual object 404 including the subset of questions 403.

In some examples, question selection module 208 comprises a neural network trained to work with QCG 202 to determine a set of questions and select the subset of questions to be provided to a user. Accordingly, question selection module 208 comprises a series of long short-term memory cells that are trained to process questions and select a subset of questions based on training that indicates which questions are likely to be relevant and/or useful to a user based on the factors discussed above.

In some examples, question selection module 208 determines information corresponding to each question of the selected subset of questions and displays the information without receiving selection of a question. For example, rather than displaying subset of questions 403 and receiving selection of one of the questions from a user, question selection module 208 may determine the highest ranked question and automatically determine information corresponding to the highest ranked question. Digital assistant 200 may then provide the information corresponding to the highest ranked question with a display of the electronic device rather than provide the subset of questions. Accordingly, question selection module 208 determines information that may be applicable or interesting to the user and provides it automatically.

Figure 5:
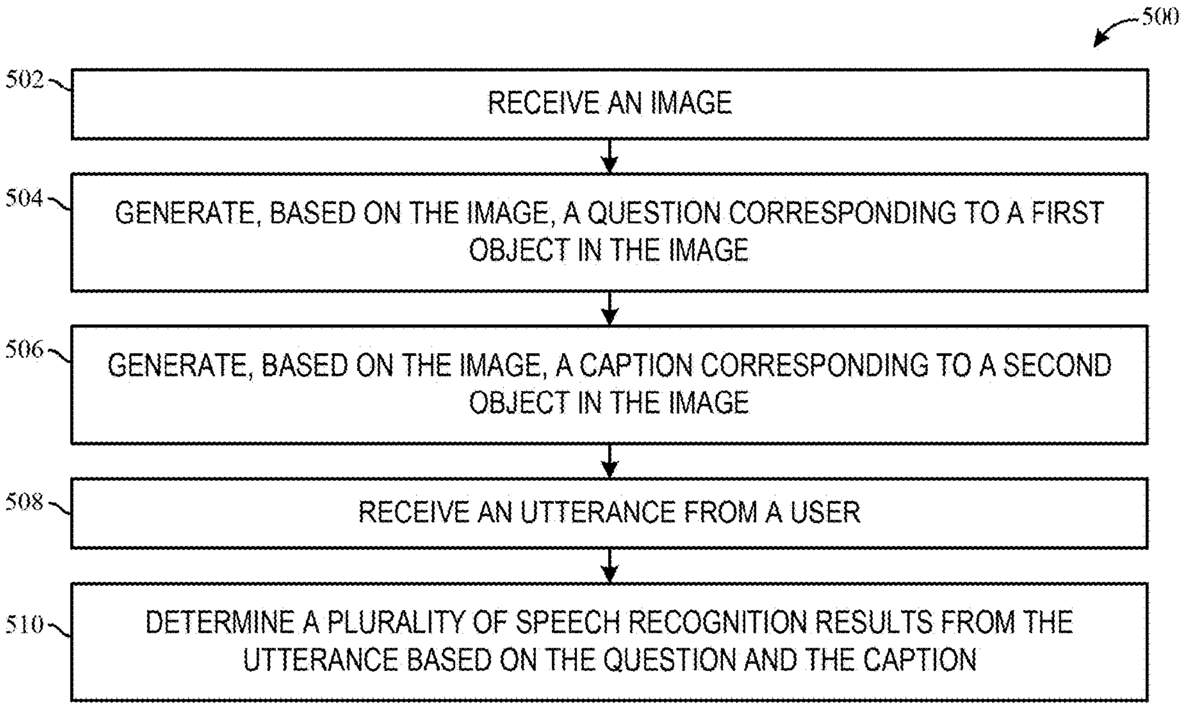
FIG. 5 is a flow diagram illustrating a method for processing images related to user input, according to various examples.

FIG. 5 is a flow diagram illustrating a method for processing images related to user input, according to various examples. Method 500 is performed at a device (e.g., device 100) with one or more input devices (e.g., a touchscreen, a mic, a camera), and a wireless communication radio (e.g., a Bluetooth connection, WiFi connection, a mobile broadband connection such as a 4G LTE connection). In some embodiments, the electronic device includes a plurality of cameras. In some examples, the device includes one or more biometric sensors which, optionally, include a camera, such as an infrared camera, a thermographic camera, or a combination thereof. Some operations in method 500 are, optionally, combined, the orders of some operations are, optionally, changed, and some operations are, optionally, omitted.

At block 502 an image (e.g., image 210, 300, 400) is received. At block 504, a question corresponding to a first object (e.g., object 301, 302, 401, 402) in the image is generated based on the image. At block 506, a caption corresponding to a second object (e.g., object 301, 302, 401, 402) in the image is generated based on the image. In some examples, the question and the caption are generated by a neural network (e.g., QCG 202). In some examples, the neural network is trained with a training image, one or more corresponding training captions, and one or more corresponding training questions.

In some examples, the question is a first question and a plurality of questions corresponding to the first object (e.g., object 301, 302, 401, 402) in the image (e.g., image 210, 300, 400) are generated based on the image, wherein the plurality of questions includes the first question. In some examples, a first probability is determined for the first question and a second probability is determined for a second question of the plurality of questions. In some examples, whether the first probability is higher than the second probability is determined and in accordance with a determination that the first probability is higher than the second probability, the first question is selected to use for determining the plurality of speech recognition results.

In some examples, the first probability is indicative of whether the first question is a question that a user would ask about the first object (e.g., object 301, 302, 401, 402) and wherein the second probability is indicative of whether the second question is a question that a user would ask about the first object.

In some examples, a plurality of probabilities are determined that correspond to the plurality of questions and the plurality of questions are ranked based on the plurality of probabilities. In some examples, a predetermined amount of highest ranking questions from the plurality of questions are selected based on the corresponding plurality of probabilities.

In some examples, the caption is a first caption and a plurality of captions corresponding to the second object (e.g., object 301, 302, 401, 402) in the image (e.g., image 210, 300, 400) are generated based on the image, wherein the plurality of captions includes the first caption. In some examples, a first probability is determined for the first caption and a second probability is determined for a second caption of the plurality of captions. In some examples, whether the first probability is higher than the second probability is determined and in accordance with a determination that the first probability is higher than the second probability, the first caption is selected to use for determining the plurality of speech recognition results.

In some examples, the first probability is indicative of whether the first caption is a caption that is applicable about the second object (e.g., object 301, 302, 401, 402) and wherein the second probability is indicative of whether the second caption is a caption that is applicable about the second object.

In some examples, a plurality of probabilities are determined that correspond to the plurality of captions and the plurality of captions are ranked based on the plurality of probabilities. In some examples, a predetermined amount of highest ranking captions from the plurality of captions are selected based on the corresponding plurality of probabilities.

In some examples, the question corresponds to both the first object (e.g., object 301, 302, 401, 402) and the second object (e.g., object 301, 302, 401, 402). In some examples, the caption corresponds to both the first object and the second object. In some examples, the first object and the second object are the same object.

At block 508, an utterance (e.g., utterance 212, 303) is received from a user. In some examples, the image (e.g., image 210, 300, 400) and the utterance are received near in time and generating the question and generating the caption occur simultaneously to processing the utterance.

At block 510, a plurality of speech recognition results are determined from the utterance (e.g., utterance 212, 303) based on the question and the caption. In some examples, determining the plurality of speech recognition results from the utterance based on the question and the caption further comprises biasing a language model with the question, and determining the plurality of speech recognition results from the utterance using the biased language model. In some examples, determining the plurality of speech recognition results from the utterance based on the question and the caption further comprises comparing a plurality of objects referenced by the plurality of speech recognition results to data displayed in a user interface of the electronic device, and selecting one or more of the plurality of speech recognition results that reference an object included in the data displayed in the user interface of the electronic device.

In some examples, a plurality of scores corresponding to the plurality of speech recognition results are determined and a speech recognition result of the plurality of speech recognition results with the highest corresponding score is selected. In some examples, a plurality of natural language results are determined based on the selected speech recognition result.

Figure 6:
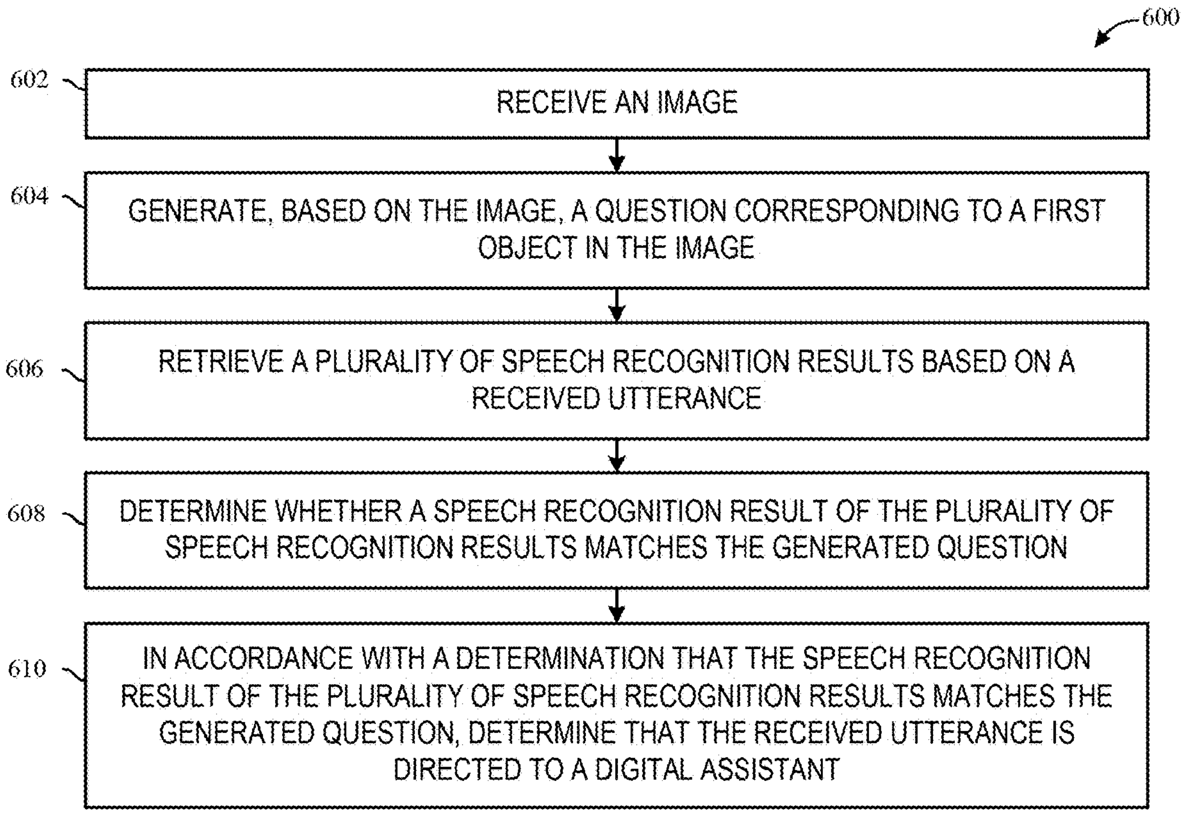
FIG. 6 is a flow diagram illustrating a method for processing images related to user input, according to various examples.

FIG. 6 is a flow diagram illustrating a method for processing images related to user input, according to various examples. Method 600 is performed at a device (e.g., device 100) with one or more input devices (e.g., a touchscreen, a mic, a camera), and a wireless communication radio (e.g., a Bluetooth connection, WiFi connection, a mobile broadband connection such as a 4G LTE connection). In some embodiments, the electronic device includes a plurality of cameras. In some examples, the device includes one or more biometric sensors which, optionally, include a camera, such as an infrared camera, a thermographic camera, or a combination thereof. Some operations in method 600 are, optionally, combined, the orders of some operations are, optionally, changed, and some operations are, optionally, omitted.

At block 602 an image (e.g., image 210, 300, 400) is received. At block 604, a question corresponding to a first object (e.g., object 301, 302, 401, 402) in the image is generated based on the image. In some examples, the question is generated by a first neural network trained with a training image and one or more corresponding training questions.

At block 606, a plurality of speech recognition results based on a received utterance (e.g., utterance 212, 303) are retrieved. At block 608 whether a speech recognition result of the plurality of speech recognition results matches the generated question is determined. In some examples, determining whether the speech recognition result of the plurality of speech recognition results matches the generated question is performed with a second neural network trained to determine an embedding based on the generated question and the speech recognition result.

In some examples, determining whether the speech recognition result of the plurality of speech recognition results matches the generated question further comprises providing the generated question and the speech recognition result to the second neural network, determining, with the second neural network, at least two embeddings based on the generated question and the speech recognition result, determining a distance between the at least two embedding, determining whether the distance between the at least two embeddings exceeds a similarity threshold, in accordance with a determination that the distance between the at least two embeddings exceeds the similarly threshold, determining that the speech recognition result matches the generated question.

At block 610, in accordance with a determination that the speech recognition result of the plurality of speech recognition results matches the generated question, it is determined that the received utterance (e.g., utterance 212, 303) is directed to a digital assistant (e.g., digital assistant 200). In some examples, in accordance with a determination that the speech recognition result of the plurality of speech recognition results does not match the generated question, it is determined that the received utterance is not directed to the digital assistant. In some examples, in accordance with a determination that the received utterance is not directed to the digital assistant, the received utterance is disregarded.

In some examples, a caption corresponding to a second object (e.g., object 301, 302, 401, 402) in the image (e.g., image 210, 300, 400) is generated based on the image. In some examples, whether an object referenced by the speech recognition result of the plurality of speech recognition results matches an object referenced by the caption is determined. In some examples, in accordance with a determination that the object referenced by the speech recognition result of the plurality of speech recognition results matches the object referenced by the caption it is determined that the received utterance (e.g., utterance 212, 303) is directed to the digital assistant (e.g., digital assistant 200).

In some examples, whether an attribute of the object (e.g., object 301, 302, 401, 402) referenced by the speech recognition result of the plurality of speech recognition results matches an attribute of the object referenced by the caption is determined. In some examples, in accordance with a determination that the attribute of the object referenced by the speech recognition result of the plurality of speech recognition results matches an attribute of the object referenced by the caption, it is determined that the received utterance (e.g., utterance 212, 303) is directed to the digital assistant (e.g., digital assistant 200).

In some examples, in accordance with a determination that the received utterance (e.g., utterance 212, 303) is directed to the digital assistant (e.g., digital assistant 200), a plurality of natural language results based on the speech recognition result is determined. In some examples, the speech recognition result is a first speech recognition result and whether a second speech recognition result of the plurality of speech recognition results matches the generated question is determined. In some examples, in accordance with a determination that the second speech recognition result of the plurality of speech recognition results matches the generated question, it is determined determining that the received utterance is directed to a digital assistant. In some examples, the generated question is a first generated questions and whether the speech recognition result of the plurality of speech recognition results matches a second generated question is determined. In some examples, in accordance with a determination that the speech recognition result of the plurality of speech recognition results matches the second generated question, it is determined that the received utterance is directed to a digital assistant.

Figure 7:
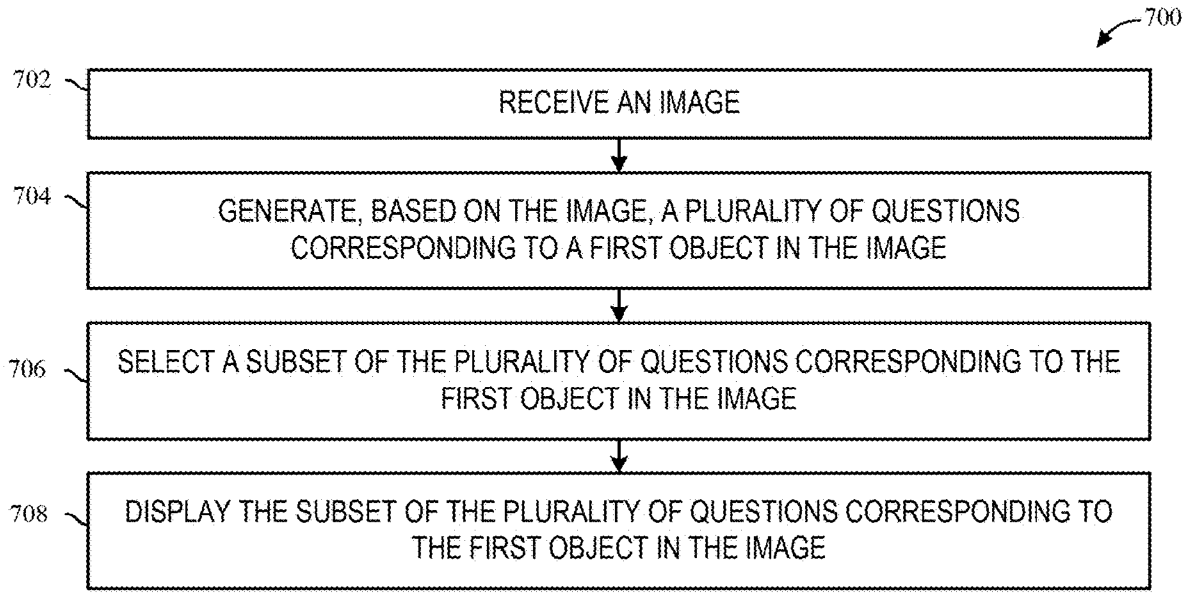
FIG. 7 is a flow diagram illustrating a method for processing images related to user input, according to various examples.

FIG. 7 is a flow diagram illustrating a method for processing images related to user input, according to various examples. Method 700 is performed at a device (e.g., device 100) with one or more input devices (e.g., a touchscreen, a mic, a camera), and a wireless communication radio (e.g., a Bluetooth connection, WiFi connection, a mobile broadband connection such as a 4G LTE connection). In some embodiments, the electronic device includes a plurality of cameras. In some examples, the device includes one or more biometric sensors which, optionally, include a camera, such as an infrared camera, a thermographic camera, or a combination thereof. Some operations in method 700 are, optionally, combined, the orders of some operations are, optionally, changed, and some operations are, optionally, omitted.

At block 702, an image (e.g., image 210, 300, 400) is received.

At block 704, a plurality of questions corresponding to a first object (e.g., object 301, 302, 401, 402) in the image (e.g., image 210, 300, 400) are generated based on the image. In some examples, the plurality of questions is a first plurality of questions and a second plurality of questions corresponding to a second object (e.g., object 301, 302, 401, 402) in the image are generated based on the image.

In some examples, generating, based on the image (e.g., image 210, 300, 400), a plurality of questions corresponding to a first object (e.g., object 301, 302, 401, 402) in the image further comprises determining whether a gaze (e.g., context data 214) of a user includes the first object, and in accordance with a determination that the gaze of the user includes the first object, selecting the first object for generating the plurality of questions. In some examples, determining whether the gaze of the user includes the first object further comprises determining a length of time (e.g., context data 214) that the gaze of the user is directed at the first object, and in accordance with a determination that the length of time that the gaze of the user is directed at the first object exceeds a predetermined threshold, determining that the gaze of the user includes the first object. In some examples, generating, based on the image, a plurality of questions corresponding to a first object in the image further comprises determining a location (e.g., context data 214) of the electronic device (e.g., electronic device 100), and selecting the first object in the image based on the location of the electronic device.

At block 706, a subset (e.g., subset of questions 403) of the plurality of questions corresponding to the first object (e.g., object 301, 302, 401, 402) in the image (e.g., image 210, 300, 400) are selected. In some examples, a subset of the first plurality of questions and the second plurality of questions are selected as suggested questions (e.g., subset of questions 403). In some examples, selecting the subset of the plurality of questions corresponding to the first object in the image further comprises determining a corresponding weight for each of the plurality of questions, ranking the plurality of questions based on the corresponding weights, determining a predetermined number of questions of the plurality of questions based on the ranking, and selecting the predetermined number of questions as the subset of the plurality of questions. In some examples, the corresponding weight is an indication of the questions relevance and wherein the relevance is based on at least one of contextual data (e.g., context data 214), digital assistant interaction history, and popularity of the question.

In some examples, selection of a question of the subset (e.g., subset of questions 403) of questions corresponding to the first object (e.g., object 301, 302, 401, 402) in the image (e.g., image 210, 300, 400) is detected. In some examples, in response to detecting selection of the question of the subset of questions corresponding to the first object in the image information about the first object based on the selected question is determined, and the information about the first object is provided (e.g., in object 404). In some examples, the information about the first object references contextual data (e.g., contextual data 214) of the electronic device (e.g., electronic device 100).

At block 708, the subset (e.g., subset of questions 403) of the plurality of questions corresponding to the first object (e.g., object 301, 302, 401, 402) in the image (e.g., image 210, 300, 400) are displayed (e.g., in object 404). In some examples, the suggested questions are displayed. In some examples, displaying the subset of the plurality of questions corresponding to the first object in the image further comprises displaying the subset of questions as a virtual item in a view (e.g., image 300, 400) of the electronic device (electronic device 100).

In some examples, generating, based on the image, a plurality of questions corresponding to a first object (e.g., object 301, 302, 401, 402) in the image (e.g., image 210, 300, 400) and selecting a subset (e.g., subset of questions 403) of the plurality of questions corresponding to the first object in the image are performed by a neural network.

In some examples, information corresponding to each question of the subset (e.g., subset of questions 403) of questions is determined and the information corresponding to each question of the subset of questions is displayed (e.g., in object 404).

As described above, one aspect of the present technology is the gathering and use of data available from various sources to improve the delivery to users of content that may be of interest to them. The present disclosure contemplates that in some instances, this gathered data may include personal information data that uniquely identifies or can be used to contact or locate a specific person. Such personal information data can include demographic data, location-based data, telephone numbers, email addresses, twitter IDs, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to deliver targeted content that is of greater interest to the user. Accordingly, use of such personal information data enables users to calculated control of the delivered content. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates examples in which users selectively block the use of, or access to, personal information data. That is, the present disclosure contemplates that hardware and/or software elements can be provided to prevent or block access to such personal information data. For example, in the case of information delivery services, the present technology can be configured to allow users to select to "opt in" or "opt out" of participation in the collection of personal information data during registration for services or anytime thereafter. In another example, users can select not to provide user information for deliver services. In yet another example, users can select to limit the length of time user information is maintained. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed examples, the present disclosure also contemplates that the various examples can also be implemented without the need for accessing such personal information data. That is, the various examples of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publicly available information.

What is claimed is:

1. A non-transitory computer-readable storage medium storing one or more programs configured to be executed by one or more processors of an electronic device, the one or more programs including instructions for:

receiving an image;

generating, based on the image, a plurality of questions corresponding to a first object in the image;

selecting a subset of the plurality of questions corresponding to the first object in the image; and displaying the subset of the plurality of questions corresponding to the first object in the image as a set of selectable questions to be provided to a digital assistant by a user.

2. The non-transitory computer-readable storage medium of claim 1, wherein the plurality of questions is a first plurality of questions, the one or more programs further including instructions for:

generating, based on the image, a second plurality of questions corresponding to a second object in the image;

selecting a subset of the first plurality of questions and a subset of the second plurality of questions as suggested questions; and displaying the suggested questions.

3. The non-transitory computer-readable storage medium of claim 1, wherein generating, based on the image, a plurality of questions corresponding to the first object in the image further comprises:

determining whether a gaze of a user includes the first object; and in accordance with a determination that the gaze of the user includes the first object, selecting the first object for generating the plurality of questions.

4. The non-transitory computer-readable storage medium of claim 3, wherein determining whether the gaze of the user includes the first object further comprises:

determining a length of time that the gaze of the user is directed at the first object; and in accordance with a determination that the length of time that the gaze of the user is directed at the first object exceeds a predetermined threshold, determining that the gaze of the user includes the first object.

5. The non-transitory computer-readable storage medium of claim 1, wherein generating, based on the image, a plurality of questions corresponding to the first object in the image further comprises:

determining a location of the electronic device; and selecting the first object in the image based on the location of the electronic device.

6. The non-transitory computer-readable storage medium of claim 1, wherein selecting the subset of the plurality of questions corresponding to the first object in the image further comprises:

determining a corresponding weight for each of the plurality of questions;

ranking the plurality of questions based on the corresponding weights;

determining a predetermined number of questions of the plurality of questions based on the ranking; and selecting the predetermined number of questions as the subset of the plurality of questions.

7. The non-transitory computer-readable storage medium of claim 6, wherein the corresponding weight is an indication of the questions relevance and wherein the relevance is based on at least one of contextual data, digital assistant interaction history, and popularity of the question.

8. The non-transitory computer-readable storage medium of claim 1, the one or more programs further including instructions for:

detecting a user input selecting a question of the subset of questions corresponding to the first object in the image; and in response to detecting the user input selecting the question of the subset of questions corresponding to the first object in the image:

determining information about the first object based on the selected question; and providing the information about the first object.

9. The non-transitory computer-readable storage medium of claim 8, wherein the information about the first object references contextual data of the electronic device.

10. The non-transitory computer-readable storage medium of claim 1, wherein displaying the subset of the plurality of questions corresponding to the first object in the image further comprises:

displaying the subset of questions as a virtual item in a view of the electronic device.

11. The non-transitory computer-readable storage medium of claim 1, wherein generating, based on the image, a plurality of questions corresponding to a first object in the image and selecting a subset of the plurality of questions corresponding to the first object in the image are performed by a neural network.

12. The non-transitory computer-readable storage medium of claim 1, the one or more programs further including instructions for:

determining information corresponding to each question of the subset of questions; and displaying the information corresponding to each question of the subset of questions.

13. An electronic device comprising:

one or more processors;

a memory; and one or more programs, wherein the one or more programs are stored in the memory and configured to be executed by the one or more processors, the one or more programs including instructions for:

receiving an image;

generating, based on the image, a plurality of questions corresponding to a first object in the image;

selecting a subset of the plurality of questions corresponding to the first object in the image; and displaying the subset of the plurality of questions corresponding to the first object in the image as a set of selectable questions to be provided to a digital assistant by a user.

14. The electronic device of claim 13, wherein the plurality of questions is a first plurality of questions, the one or more programs further including instructions for:

generating, based on the image, a second plurality of questions corresponding to a second object in the image;

selecting a subset of the first plurality of questions and a subset of the second plurality of questions as suggested questions; and displaying the suggested questions.

15. The electronic device of claim 13, wherein generating, based on the image, a plurality of questions corresponding to the first object in the image further comprises:

determining whether a gaze of a user includes the first object; and in accordance with a determination that the gaze of the user includes the first object, selecting the first object for generating the plurality of questions.

16. The electronic device of claim 15, wherein determining whether the gaze of the user includes the first object further comprises:

determining a length of time that the gaze of the user is directed at the first object; and in accordance with a determination that the length of time that the gaze of the user is directed at the first object exceeds a predetermined threshold, determining that the gaze of the user includes the first object.

17. The electronic device of claim 13, wherein generating, based on the image, a plurality of questions corresponding to the first object in the image further comprises:

determining a location of the electronic device; and selecting the first object in the image based on the location of the electronic device.

18. The electronic device of claim 13, wherein selecting the subset of the plurality of questions corresponding to the first object in the image further comprises:

determining a corresponding weight for each of the plurality of questions;

ranking the plurality of questions based on the corresponding weights;

determining a predetermined number of questions of the plurality of questions based on the ranking; and selecting the predetermined number of questions as the subset of the plurality of questions.

19. The electronic device of claim 18, wherein the corresponding weight is an indication of the questions relevance and wherein the relevance is based on at least one of contextual data, digital assistant interaction history, and popularity of the question.

20. The electronic device of claim 13, the one or more programs further including instructions for:

detecting a user input selecting a question of the subset of questions corresponding to the first object in the image; and in response to detecting the user input selecting the question of the subset of questions corresponding to the first object in the image:

determining information about the first object based on the selected question; and providing the information about the first object.

21. The electronic device of claim 20, wherein the information about the first object references contextual data of the electronic device.

22. The electronic device of claim 13, wherein displaying the subset of the plurality of questions corresponding to the first object in the image further comprises:

displaying the subset of questions as a virtual item in a view of the electronic device.

23. The electronic device of claim 13, wherein generating, based on the image, a plurality of questions corresponding to a first object in the image and selecting a subset of the plurality of questions corresponding to the first object in the image are performed by a neural network.

24. The electronic device of claim 13, the one or more programs further including instructions for:

determining information corresponding to each question of the subset of questions; and displaying the information corresponding to each question of the subset of questions.

25. A method, comprising:

at an electronic device with one or more processors and memory:

receiving an image;

generating, based on the image, a plurality of questions corresponding to a first object in the image;

selecting a subset of the plurality of questions corresponding to the first object in the image; and displaying the subset of the plurality of questions corresponding to the first object in the image as a set of selectable questions to be provided to a digital assistant by a user.

26. The method of claim 25, wherein the plurality of questions is a first plurality of questions, the method further comprising:

generating, based on the image, a second plurality of questions corresponding to a second object in the image;

selecting a subset of the first plurality of questions and a subset of the second plurality of questions as suggested questions; and displaying the suggested questions.

27. The method of claim 25, wherein generating, based on the image, a plurality of questions corresponding to the first object in the image further comprises:

determining whether a gaze of a user includes the first object; and in accordance with a determination that the gaze of the user includes the first object, selecting the first object for generating the plurality of questions.

28. The method of claim 27, wherein determining whether the gaze of the user includes the first object further comprises:

determining a length of time that the gaze of the user is directed at the first object; and in accordance with a determination that the length of time that the gaze of the user is directed at the first object exceeds a predetermined threshold, determining that the gaze of the user includes the first object.

29. The method of claim 25, wherein generating, based on the image, a plurality of questions corresponding to the first object in the image further comprises:

determining a location of the electronic device; and selecting the first object in the image based on the location of the electronic device.

30. The method of claim 25, wherein selecting the subset of the plurality of questions corresponding to the first object in the image further comprises:

determining a corresponding weight for each of the plurality of questions;

ranking the plurality of questions based on the corresponding weights;

determining a predetermined number of questions of the plurality of questions based on the ranking; and selecting the predetermined number of questions as the subset of the plurality of questions.

31. The method of claim 30, wherein the corresponding weight is an indication of the questions relevance and wherein the relevance is based on at least one of contextual data, digital assistant interaction history, and popularity of the question.

32. The method of claim 25, further comprising:

detecting a user input selecting a question of the subset of questions corresponding to the first object in the image; and in response to detecting the user input selecting the question of the subset of questions corresponding to the first object in the image:

determining information about the first object based on the selected question; and providing the information about the first object.

33. The method of claim 32, wherein the information about the first object references contextual data of the electronic device.

34. The method of claim 25, wherein displaying the subset of the plurality of questions corresponding to the first object in the image further comprises:

displaying the subset of questions as a virtual item in a view of the electronic device.

35. The method of claim 25, wherein generating, based on the image, a plurality of questions corresponding to a first object in the image and selecting a subset of the plurality of questions corresponding to the first object in the image are performed by a neural network.

36. The method of claim 25, further comprising:

determining information corresponding to each question of the subset of questions; and displaying the information corresponding to each question of the subset of questions.

* * * * *